United States Patent
Sasaoka

(10) Patent No.: US 12,474,707 B2
(45) Date of Patent: Nov. 18, 2025

(54) TRAVEL ROUTE SIMULATOR FOR CONSTRUCTION MACHINE

(71) Applicant: KOBELCO CONSTRUCTION MACHINERY CO., LTD., Hiroshima (JP)

(72) Inventor: Yoshio Sasaoka, Tokyo (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 243 days.

(21) Appl. No.: 17/640,621

(22) PCT Filed: Jun. 10, 2020

(86) PCT No.: PCT/JP2020/022902
§ 371 (c)(1),
(2) Date: Mar. 4, 2022

(87) PCT Pub. No.: WO2021/049112
PCT Pub. Date: Mar. 18, 2021

(65) Prior Publication Data
US 2022/0404834 A1    Dec. 22, 2022

(30) Foreign Application Priority Data

Sep. 11, 2019   (JP) .................. 2019-165746

(51) Int. Cl.
*G05D 1/00*   (2024.01)
*G06Q 10/06*   (2023.01)

(52) U.S. Cl.
CPC ........... *G05D 1/0212* (2013.01); *G06Q 10/06* (2013.01)

(58) Field of Classification Search
CPC .............................. G05D 1/0212; G06Q 10/06
(Continued)

(56) References Cited

U.S. PATENT DOCUMENTS

| 5,787,233 A * | 7/1998 | Akimoto ............. G06Q 10/047 706/45 |
| 2011/0246054 A1* | 10/2011 | Toma ...................... B61L 27/12 701/532 |

(Continued)

FOREIGN PATENT DOCUMENTS

| JP | 2516272 B2 | 7/1996 |
| JP | H10-305992 A | 11/1998 |

(Continued)

OTHER PUBLICATIONS

"Integrated scheduling of crane handling and truck transportation in a maritime container terminal" Published by Elsevier (Year: 2013).*

(Continued)

*Primary Examiner* — Zeina Elchanti
(74) *Attorney, Agent, or Firm* — Carrier, Shende & Associates P.C.; Joseph P. Carrier; Jeffrey T. Gedeon

(57) ABSTRACT

A simulator is provided which can reduce a standby time of a construction machine, enable a process plan for construction machine work to be executed, and enable an unskilled operator to improve work efficiency of a construction machine. A simulator for work by using a construction machine transporting a material includes a construction machine characteristic information acquisition unit which acquires construction machine characteristic information as information about a characteristic of the construction machine, a material information acquisition unit which acquires material information as information about a material to be transported by the construction machine, and a transportation route information acquisition unit which acquires transportation route information including a transportation route in transportation of the material, and a transportation time for the material is generated based on the (Continued)

construction machine characteristic information, the material information, and the transportation route information.

5 Claims, 11 Drawing Sheets

(58) Field of Classification Search
USPC .......................................................... 705/338
See application file for complete search history.

(56) References Cited

U.S. PATENT DOCUMENTS

| | | | |
|---|---|---|---|
| 2018/0060814 A1* | 3/2018 | Seaman | G06Q 50/40 |
| 2021/0206605 A1* | 7/2021 | Rotem | B66C 13/063 |
| 2021/0233230 A1* | 7/2021 | Yodawara | G06Q 10/063 |

FOREIGN PATENT DOCUMENTS

| | | |
|---|---|---|
| JP | 2006-076747 A | 3/2006 |
| JP | 2013-145497 A | 7/2013 |
| JP | 2014-178794 A | 9/2014 |
| JP | 2017-166979 A | 9/2017 |
| JP | 2018-522297 A | 8/2018 |

OTHER PUBLICATIONS

Office Action dated Apr. 26, 2022 issued in the corresponding Japanese Patent Application No. 2019-165746.

* cited by examiner

TRAVEL ROUTE SIMULATOR FOR CONSTRUCTION MACHINE

TECHNICAL FIELD

The present invention relates to a simulator for work by using a construction machine transporting a material.

BACKGROUND ART

As for simulators, as disclosed in Patent Literature 1, a technique has been proposed in which position information can easily be acquired in a process of construction execution. A construction work support device in the technique includes a receiver, a position calculation unit, and a construction work support processing unit. The receiver receives a beacon signal which is used for obtaining the position information from a transmitter arranged in a construction work site. The position calculation unit reads out information, which indicates an installation place of the transmitter associated with the beacon signal received by the receiver, from a storage device storing design information of a structure which includes information indicating the installation place of the transmitter and obtains the position of the receiver by using the read-out information. The construction work support processing unit performs processing for supporting construction work based on the position of the receiver which is obtained by the position calculation unit.

Patent Literature 2 proposes a site facility automation modeling system based on building information model BIM (building information modeling) which can express a shape of a three-dimensional structure in a computer and causes spaces to be composed, members, apparatuses, and so forth to have attribute information such as specifications, performance, and costs. The modeling system includes an object unit, an input unit, and a control unit. The object unit selects and edits a size, a kind, and a type of an object including one or more of members and equipment which are arranged as site facilities. The input unit sets the position and sections of an object which are edited by the object unit by line drawing. The control unit performs control such that a model of an object by edited data by the object unit is arranged along lines set by the input unit and performs control such that the model is output to a display. Note that the BIM denotes a building information model, about an object to be constructed, in which spaces to be composed, members, apparatuses, and so forth are provided with attribute information such as specifications, performance, and costs in addition to three-dimensional shape information created in a computer. The BIM includes not only models in design phases for the purpose of various investigations about design and creation of engineering drawings but also models in construction execution phases for the purpose of a construction execution plan, investigations and checking about settlement, coordination with working drawings by specialty constructors, and creation of construction execution drawings.

CITATION LIST

Patent Literature

Patent Literature 1: Japanese Patent Laid-Open No. 2017-166979
Patent Literature 2: Japanese Translation of PCT International Application Publication No. 2018-522297

SUMMARY OF INVENTION

Technical Problem

In recent years, while simulation software for construction execution by construction machines such as cranes has been developed, a problem as one example is that a simulation without considering a working time cannot increase a running rate of whole work.

In systems disclosed in Patent Literatures 1 and 2, a problem as another example is that a working time of whole work cannot be known.

An object of the present invention, which has been made in consideration of problems in above related art, is to provide a simulator that can reduce a standby time of a construction machine, enable a process plan for construction machine work to be executed, and enable an unskilled operator to improve work efficiency of a construction machine.

Solution to Problem

A simulator of the present invention is a simulator for work by using a construction machine transporting a material, the simulator including:
- a construction machine characteristic information acquisition unit which acquires construction machine characteristic information as information about a characteristic of the construction machine;
- a material information acquisition unit which acquires material information as information about a material to be transported by the construction machine; and
- a transportation route information acquisition unit which acquires transportation route information including a transportation route in transportation of the material, in which
- a transportation time for the material is generated based on the construction machine characteristic information, the material information, and the transportation route information.

Here, "acquiring" means execution of any information processing for preparing information for other information processing such as receiving information by corresponding components, searching for or reading out information from a database or a memory, performing evaluation, measurement, estimation, setting, determination, search, prediction, and so forth about information by executing designated computation processing for basic information obtained by reception, detection, and so forth, making information apparent by decoding a packet obtained by reception and so forth, and further saving information obtained by evaluation and so forth in a memory.

DESCRIPTION OF EMBODIMENTS

Figure 1:
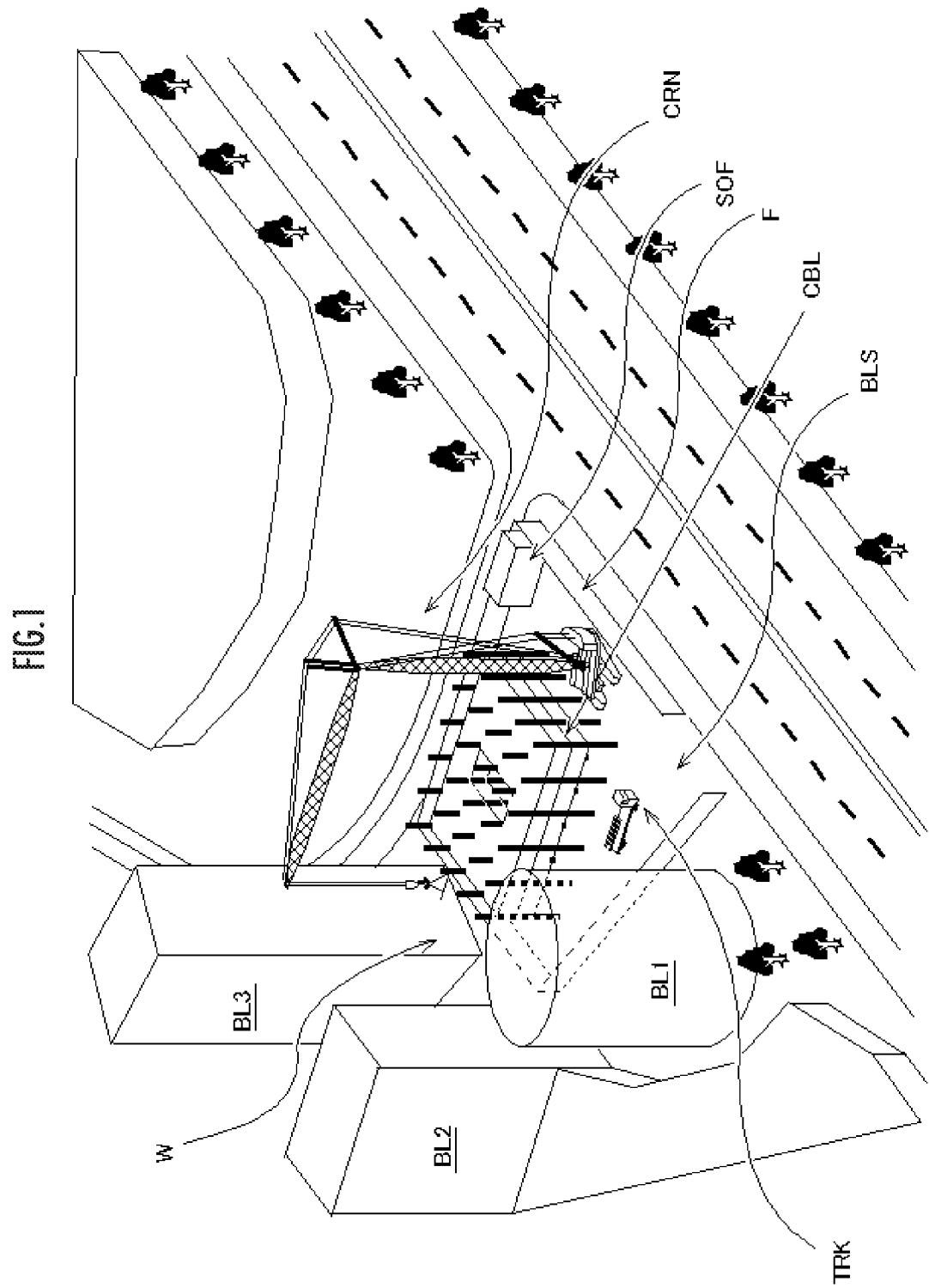
FIG. 1 is a birds-eye view in a virtual space which schematically represents a crawler type crane and a construction site, which are modeled as a three-dimensional model in a simulator of a first embodiment.

Simulators of embodiments of the present invention will hereinafter be described with reference to drawings. As one example, a description will be made about a simulator of the present embodiment in which a construction process by crane work is assumed by using a process plan for a construction machine work as an execution situation. Note that the present invention is not limited to the following embodiments. Further, in the embodiments, the same reference characters are given to components that have substantially the same functions and configuration, and descriptions thereof will thus not be repeated.

First Embodiment

FIG. 1 is a birds-eye view in a virtual space which schematically represents a crawler type crane CRN and a construction site BLS, which are modeled as a three-dimensional model in the simulator of a first embodiment. In the construction site BLS, the crane CRN, a truck TRK, and a site office SOF are present close to a building to be constructed CBL in a lot surrounded by a fence F. Existing buildings BL1, BL2, and BL3 are present around the fence F. FIG. 1 illustrates a circumstance where a material as a lifting load W is transported from the truck TRK onto the building to be constructed CBL by the crane CRN. As an example, a simulation of a transportation work by the crane CRN will be described.

[Simulator]

Figure 2:
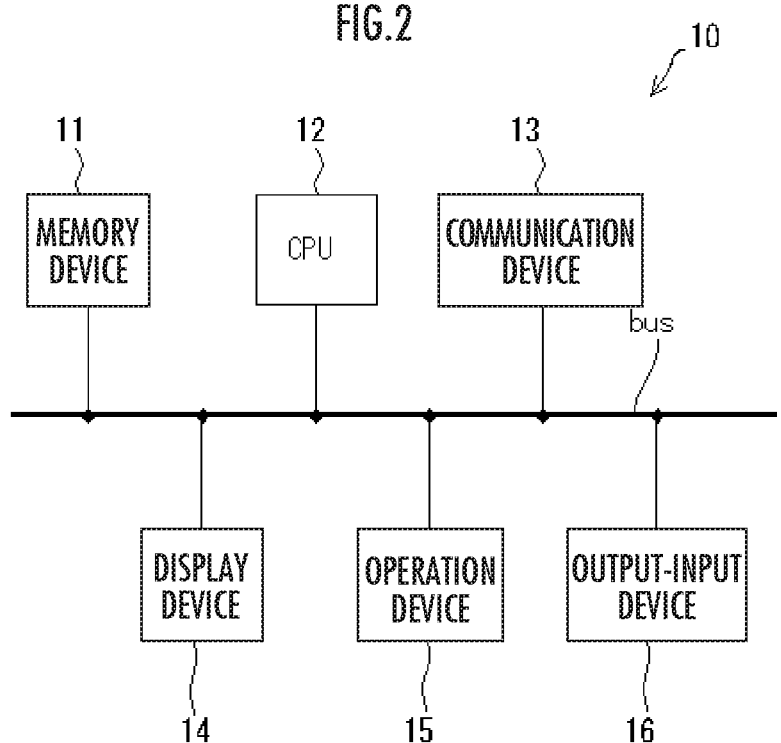
FIG. 2 is a configuration diagram illustrating a basic configuration of a computer used as hardware of the simulator of the first embodiment.

FIG. 2 is a configuration diagram illustrating a basic configuration of a computer used as hardware of a simulator 10. The simulator 10 of the present embodiment is realized by performance of processing following a program by a common computer. However, the simulator 10 may be configured as a dedicated device.

The simulator 10 of the computer includes a memory device 11 such as a non-volatile flash memory or a hard disk which stores various kinds of data and programs, a CPU 12 which performs processing of various kinds of data following programs stored in the memory device 11, a communication device 13 as an interface which performs data communication with an external communication device (not illustrated), a display device 14 such as a liquid crystal display which displays an image to a user, an operation device 15 such as a keyboard, a mouse, or a touch panel which accepts an operation by the user, and an output-input device 16 such as a USB port which accepts a recording medium.

Figure 3:
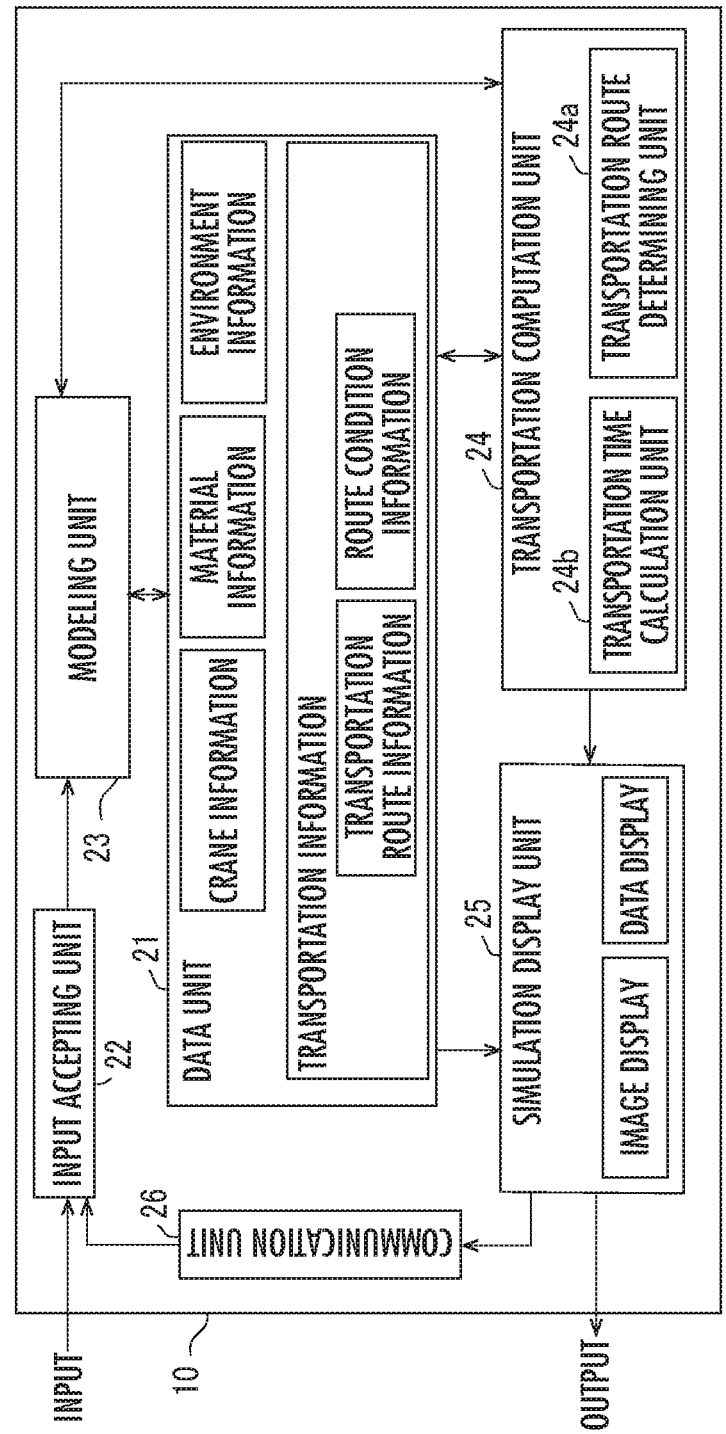
FIG. 3 is a block diagram illustrating a function configuration of the simulator of the first embodiment.

FIG. 3 is a block diagram illustrating a function configuration of the simulator 10. Processing following a program for the simulator 10 of the computer is performed, and the simulator 10 including the function configuration illustrated in FIG. 3 is thereby realized.

Function units of the simulator 10 illustrated in FIG. 3 include a data unit 21 which stores various kinds of data, an input accepting unit 22 which accepts various kinds of data, a modeling unit 23, a transportation computation unit 24, a simulation display unit 25, and a communication unit 26. Here, the data unit 21, the input accepting unit 22, and the modeling unit 23 collectively function as a crane information acquisition unit which acquires crane information, a material information acquisition unit which acquires material information as information about a material to be transported by the crane, and a transportation route information acquisition unit which acquires transportation route information including plural material positions (a start point, a passing point, and an end point which are input by the user) in transportation of a material. Inputs to the information acquisition units such as the transportation route information acquisition unit are not limited to inputs by the user but include all measures by which information is input from the outside via the communication device 13 and the output-input device 16 in addition to the operation device 15.

[Outline Simulation of Crane Transportation Work by Simulator 10]

Figure 4:
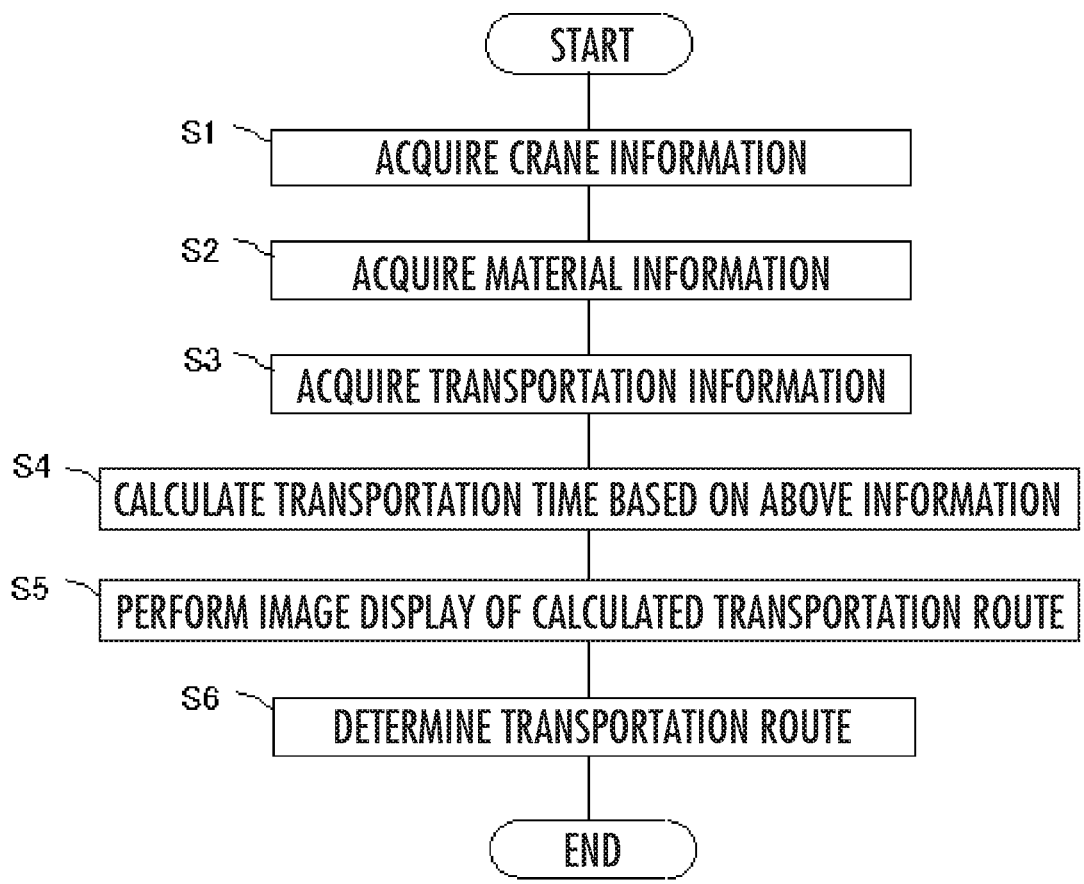
FIG. 4 is a flowchart illustrating an outline of a simulation of transportation work by a crane as one example to be executed by the simulator of the first embodiment.

FIG. 4 illustrates a flow representing an outline of a simulation of transportation work by the crane as one example to be executed by the simulator 10.

STEP 1: The simulator 10 acquires the crane information (for example, specification data of the crane (the crane CRN in FIG. 1) such as a kind, a size, a weight, an arrangement position, a maximum working radius, a lifting ability, and crane control information) and retains the crane information in the memory device 11 (FIG. 2). The crane control information includes control information as references of action speeds of the crane (for example, a lifting speed of the crane and a swiveling speed of the crane). The crane information may be acquired from the outside or the crane information other than the arrangement position may be acquired from information which is in advance stored in the simulator.

STEP 2: The simulator 10 acquires the material information (such as a material weight, a size, and a shape of a material, for example).

STEP 3: The simulator 10 acquires transportation information (such as positions of a start point, a passing point, and an end point of a material (lifting load) as the transportation route information from the user, for example). Further, in the simulator 10, the transportation route information can include a time zone which is designated by the user and in which a material (lifting load) is transported. The time zone is included in the transportation route information, and it thereby becomes possible to execute a simulation for the crane in another time zone than the above time zone.

STEP 4: The simulator 10 calculates (simulates) a transportation route and a transportation time based on the above crane information, material information, and transportation information.

STEP 5: The display device 14 of the simulator 10 performs image display of the calculated transportation route.

STEP 6: The simulator 10 determines the transportation route.

A description will be made about the function units of the simulator 10 which execute a simulation of the above transportation work and are illustrated in FIG. 3.

[Input Accepting Unit 22]

The input accepting unit 22 accepts information about a material as the lifting load W, the crane CRN, and the building to be constructed CBL and the transportation route information (including the time zone in which a material is transported) about the start point and the end point of transportation of the lifting load W and the passing point to be passed through on the way, for example, which are acquired by inputs by the user, for example, in transportation computation. The transportation route information may be accepted not only at the beginning but may be accepted and updated also at any time through a screen by the user.

Further, the input accepting unit 22 can, by inputs by the user, for example, acquire various kinds of data (such as the crane information, the material information, and environment information including obstacles) necessary for the transportation computation from the outside. Note that the input accepting unit 22 accepts data inputs by the user via the operation device 15 and the output-input device 16 and accepts data inputs via the communication device 13. Further, not via the input accepting unit 22, various kinds of data necessary for the transportation computation, which are in advance stored in the simulator (the memory device 11 (FIG. 2)), may be used.

[Modeling Unit 23]

The modeling unit 23 performs processing of generating calculation model data which correspond to various kinds of data (such as the crane information (including the crane CRN), the material information (including the lifting load W), and the environment information including obstacles), for example, polygon data, voxel data, or the like and of storing the calculation model data in the data unit 21 described later. Note that in a case where data of an actual object which are acquired from the outside can be used for calculation without any change, the modeling unit 23 stores the data in the data unit 21 without any change. How margins (distances) of boundary regions (such as sizes and shapes) among models are defined can be set by the user by the input accepting unit 22, for example.

The modeling unit 23 has a center-of-gravity evaluation function, and the center-of-gravity evaluation function evaluates the center of gravity of a material based on the material information stored in the data unit 21 and stores center-of-gravity information in the data unit 21 while associating the center-of-gravity information with the material. Further, in a case where the present embodiment is joined to a BIM simulation system and where data of the evaluated center of gravity of the material is present on the BIM simulation system side, the center-of-gravity evaluation function acquires the above data.

That is, the center of gravity of the material is an important factor when the material is transported by the crane, and a lifting position is displaced depending on the position of the center of gravity. Thus, the center-of-gravity evaluation function of the modeling unit 23 evaluates the center of gravity as data for supplementing the material information. Note that the center-of-gravity information evaluated by this center-of-gravity evaluation function of the modeling unit 23 is used for creation of a route candidate by the transportation computation unit 24.

[Transportation Computation Unit 24]

The transportation computation unit 24 calculates a transportation route of the lifting load W, in which the lifting load W does not contact with obstacles, based on information which is recognized by the modeling unit 23 and stored in the data unit 21 described later and thereby generates the route candidate (transportation route determining unit 24a). The transportation computation unit 24 predicts and determines a transportation time of each candidate of route candidates (transportation time calculation unit 24b). That is, the transportation computation unit 24 generates the transportation time for a material based on the crane information, the material information, and the transportation information (such as positions of the start point, the passing point, and the end point of the material (lifting load) which are input by the user, for example).

[Simulation Display Unit 25]

Through the modeling unit 23, the simulation display unit 25 instructs the display device 14 to display the transportation route of the lifting load W as a computation result of the transportation computation unit 24 and various kinds of information in the data unit 21.

[Communication Unit 26]

Through the modeling unit 23, the communication unit 26 instructs the communication device 13 to perform a data input to the input accepting unit 22 and a data output from the simulation display unit 25.

[Data Unit 21]

As illustrated in FIG. 3, the data unit 21 of the simulator 10 of the present embodiment stores the crane information, the material information (the weight, size, shape, and the like which represent characteristics of the lifting load W (material)), the environment information (data of objects around the crane CRN and the like), and the transportation information (information about the lifting load W which relates to the crane CRN, the lifting load W, and the environment information). In the following, (1) crane information, (2) material information, (3) environment information, and (4) transportation information will be described in order.

(1) Crane Information

The crane information, which includes specification data such as the kind, size, weight, arrangement position, maximum working radius, and lifting ability of the crane CRN, the crane control information, other information, and so forth, is stored for modeling a target crane with actual crane specification data and modeling data of a modeled crane being associated with an identifier for each crane. The modeling data of the crane information are generated by the modeling unit 23.

Figure 5:
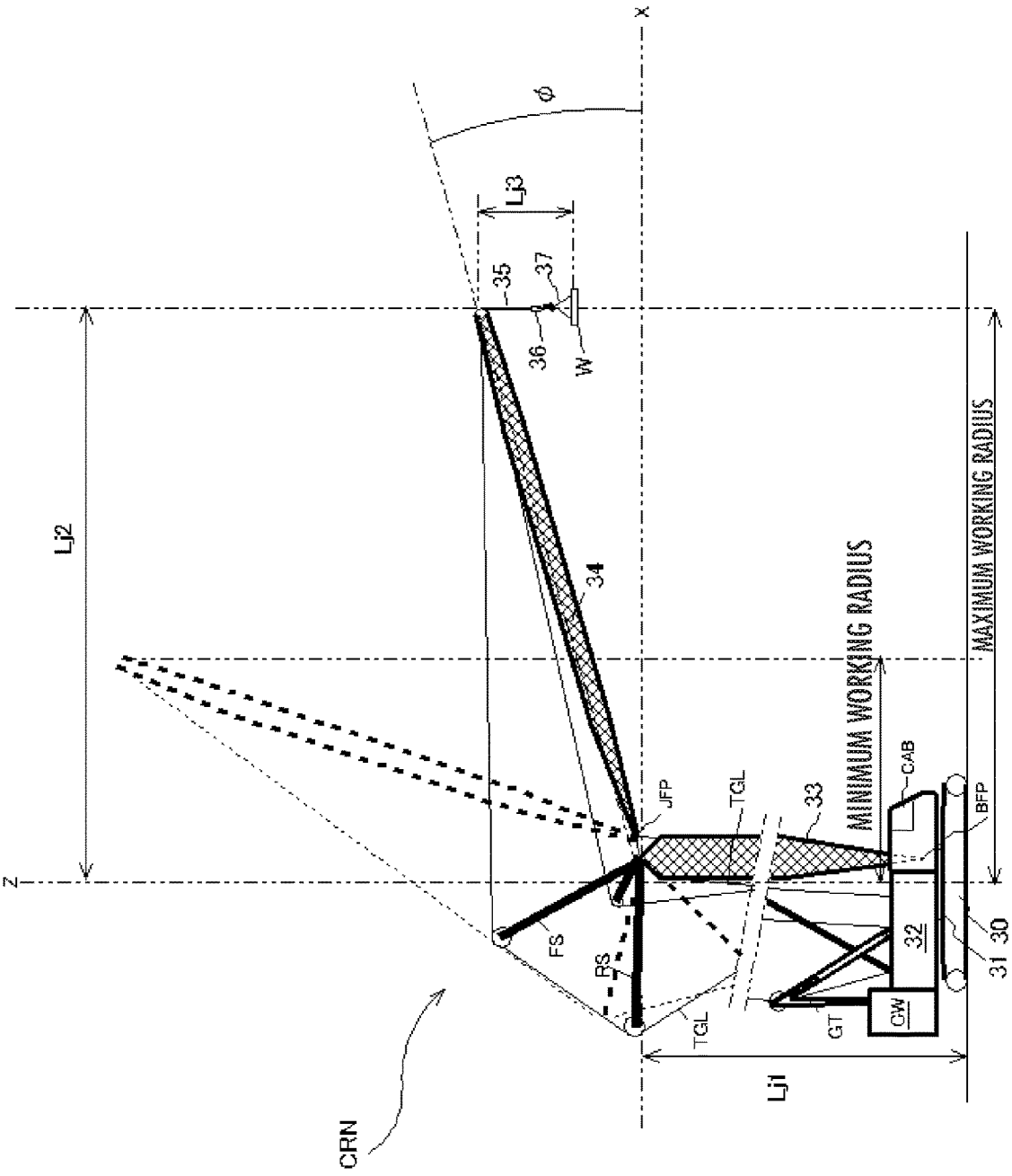
FIG. 5 is a side view illustrating a crane for explaining actual data of a size of the crane in crane information of the simulator of the first embodiment.

FIG. 5 is a side view of the crane CRN which illustrates the crane CRN for explaining actual data of the size of the crane in the crane information. In the crane CRN, an upper swiveling body 32 is swivelably mounted on a lower travelable body 30 with a swiveling device 31 interposed therebetween. A cabin CAB constituting an operator cab is provided to a front portion of the upper swiveling body 32, and a counterweight CW is provided to its rear portion. The crane CRN includes a tower boom 33 which is provided to an upper portion of the upper swiveling body 32 on the swiveling device 31 and a jib 34 which extends from upper distal end of the tower boom 33 to the outside to be capable of derricking. A base end (lower end) of the tower boom 33 is supported by the upper swiveling body 32 to be capable of derricking around a boom foot pin BFP. A base end of the jib 34 is coupled with an upper end portion of the tower boom 33 to be capable of derricking by a jib foot pin JFP. The upper distal end of the tower boom 33 is supported by a tower guideline TGL via a gantry GT to be capable of derricking. A distal end of the jib 34 is supported, to be capable of derricking, by a jib guideline JGL via a front strut FS and a rear strut RS on a back surface side of the upper end portion of the tower boom 33. The crane CRN further includes a wire rope 35 which hangs right down from a distal end portion of the jib 34 and a hook portion 36 which is attached to a distal end of the wire rope 35. A material as the lifting load W is attached to the hook portion 36 of the crane CRN via a sling rope 37 and is transported. The crane CRN further includes a camera (not illustrated) which is attached to the distal end portion of the jib 34 and captures an image of the lifting load W right below the distal end portion and transmits a captured image from the camera to a monitor provided to the cabin CAB or the like.

An operating person operates the swiveling device 31, the jib 34, and so forth while visually checking, from the cabin CAB or the monitor, a worker in an area around a part right below the distal end portion of the jib 34, the position and shape of heavy machinery, and the position of the lifting load W in the construction site BLS and thereby performs various operations of swiveling and derricking of the jib 34 and delivery and hoist of the wire rope 35.

As size data in the crane information for modeling the crane CRN, Lj1 (the distance on the swiveling center line (Z axis) from the ground to the jib foot pin JFP), Lj2 (the distance from the swiveling center line (Z axis) of the swiveling device 31 to the distal end portion of the jib 34), and Lj3 (the distance from the distal end of the jib 34 to the lifting load W) are input to the simulator 10. In addition, as the size data for modeling the crane CRN, maximum and minimum working radii, a lift, and rated speeds (hoist and swiveling) are also input to the simulator 10.

In order to model the crane CRN, the modeling unit 23 sets a reference coordinate system as crane position information in the crane information. Data which indicate various positions (coordinates) and so forth based on a Z axis (perpendicular direction) of the reference coordinate system (orthogonal XYZ axes) are stored in the data unit 21.

Figure 6:
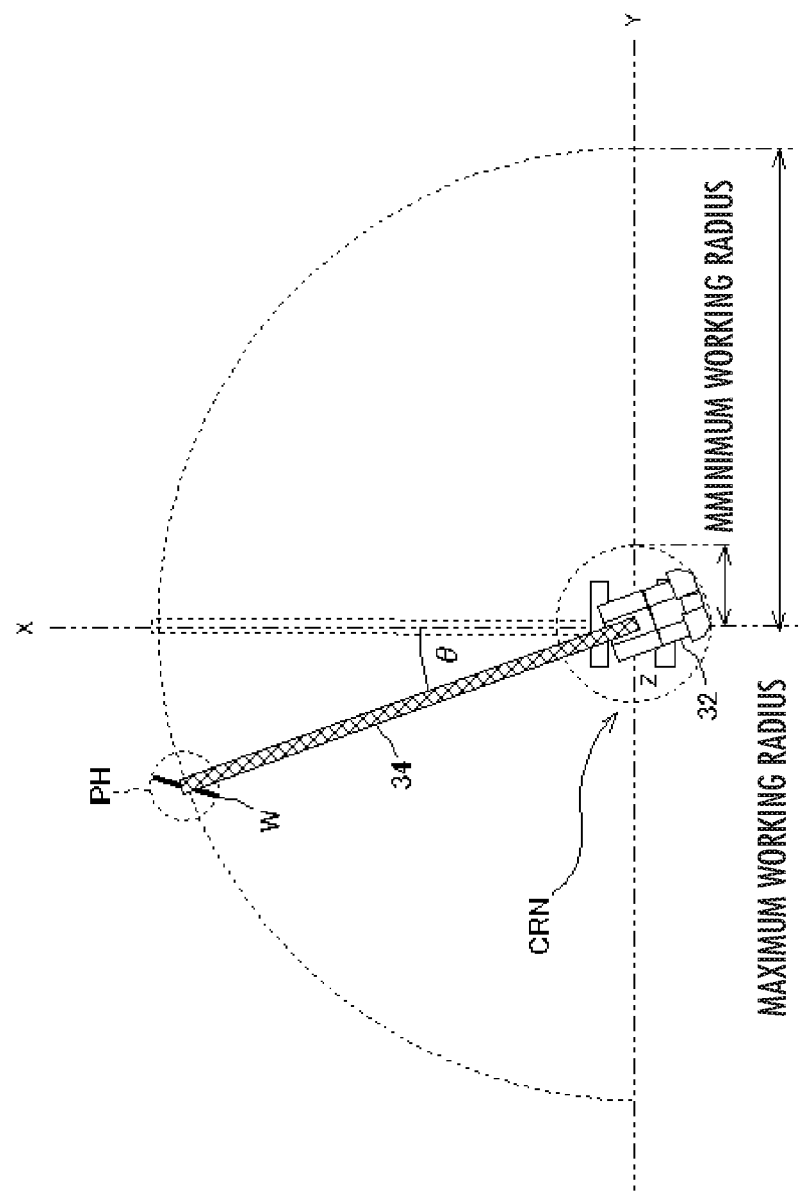
FIG. 6 is a top view illustrating the crane for explaining the actual data of the simulator of the first embodiment.

An expression example of an angle which defines transportation of the lifting load W is illustrated in FIG. 5 and FIG. 6 (a top view of FIG. 5). As illustrated in FIG. 5 and FIG. 6, basically, it is assumed that X denotes a first direction (a front direction (initial direction) of the lifting load W), Y denotes a second direction (a lateral direction of the lifting load W), and Z denotes a third direction (a vertical direction of the lifting load W). Directions in which an operation of moving the lifting load W by the crane CRN is possible are θ as a first angle (swiveling angle) and φ as a second angle (derricking angle, inclination angle). For example, in FIG. 6, the lifting load W in the position of coordinates (Xw, Yw, Zw) after being rotated by a predetermined angle (θ) around the Z axis by a first rotation posture angle (θ) indicates the coordinates resulting from rotation by a predetermined angle (φ) around the Y axis by a second rotation posture angle (φ).

(2) Material Information

When a target crane is modeled, the material information is stored in the data unit 21 while actual material data and data of a crane modeled based on the actual material data are associated with an identifier for each material. Modeling data of the material information are generated by the modeling unit 23. Further, in a case where the present embodiment is joined to the BIM simulation system and where BIM part information as the material information is present on the BIM simulation system side, the BIM part information is acquired. In a case where the present embodiment is not joined to the BIM simulation system, the material information is input via the output-input device.

Figure 7A:
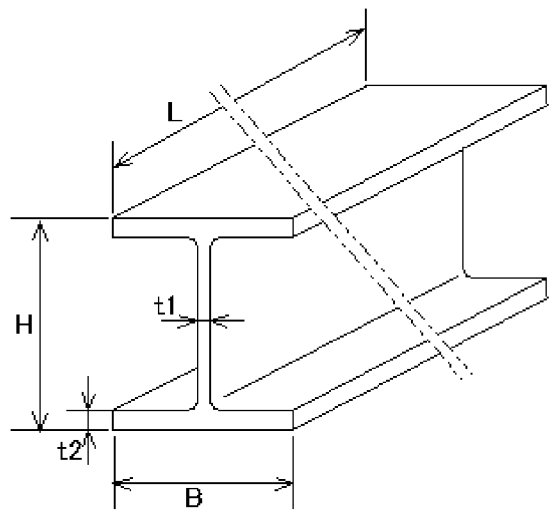
FIG. 7A and FIG. 7B are outline diagrams illustrating an example of a material to be used for a pillar and a beam for explaining actual data of material information of the simulator of the first embodiment.
Figure 7B:
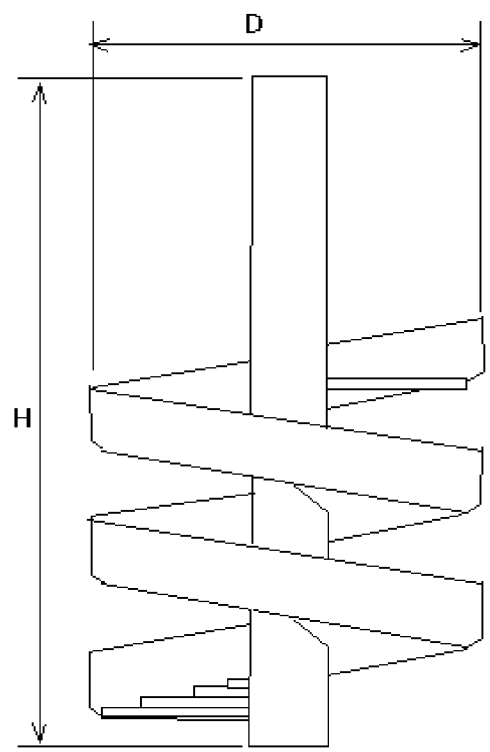

FIG. 7A and FIG. 7B are outline diagrams illustrating a steel material to be used for a pillar and a beam and stairs for explaining data of the material information (BIM part information).

FIG. 7A illustrates H-shaped steel which is shaped steel whose cross section has an H shape, and its size is expressed as "H-200 (H dimension)×100 (B dimension)×5.5 (t1 dimension)×8 (t2 dimension)" (mm), for example. The shape and dimensions of H-shaped steel are defined by JIS G3192 or the like, dimensions (mm), a unit mass (kg/m), and so forth as actual data of each steel material, which together include a gross weight and a length, are input to the simulator 10. In addition to H-shaped steel, I-shaped steel whose cross section has an "I" shape, L-shaped steel whose cross section has a shape close to an "L" shape, a square steel pipe of a box column pillar, and so forth are present. FIG. 7B illustrates an example of helical stairs made of steel materials, and although not very specifically, data of the helical stairs are input to the simulator 10 as actual data together with a gross weight such that the data include "height (H dimension)" and "radius (D dimension)" (mm). Those pieces of information are important information for evaluating the center of gravity of a material.

Those pieces of the material information for modeling the crane CRN are stored as actual data in the data unit 21. The modeling unit 23 generates width data of a circular column which has, as its bottom surface, the circumscribed circle (the radius from the center of gravity) of the lifting load W such as H-shaped steel, the lifting load W being made horizontal by slinging, and which has the same height as the lifting load height, for example, as modeling data for calculating sizes based on actual data for material modeling, and the above width data are also stored in the data unit 21. Such a circular column of the lifting load W (H-shaped steel) is illustrated in FIG. 6 by a reference character PH. Data of the width of a region which the lifting load reaches based on data of the diameter of such a circular column PH of the lifting load W may be data in which a predetermined margin is added such that horizontal H-shaped steel as the lifting load W does not contact with obstacles. In addition, for example, in a case where an end portion of H-shaped steel is vertically lifted by using a clamping device or the like, the inscribed circular column of the H dimension and the B dimension of the H-shaped steel can be generated as modeling data for calculation, and this can also be stored in the data unit 21.

Figure 8:
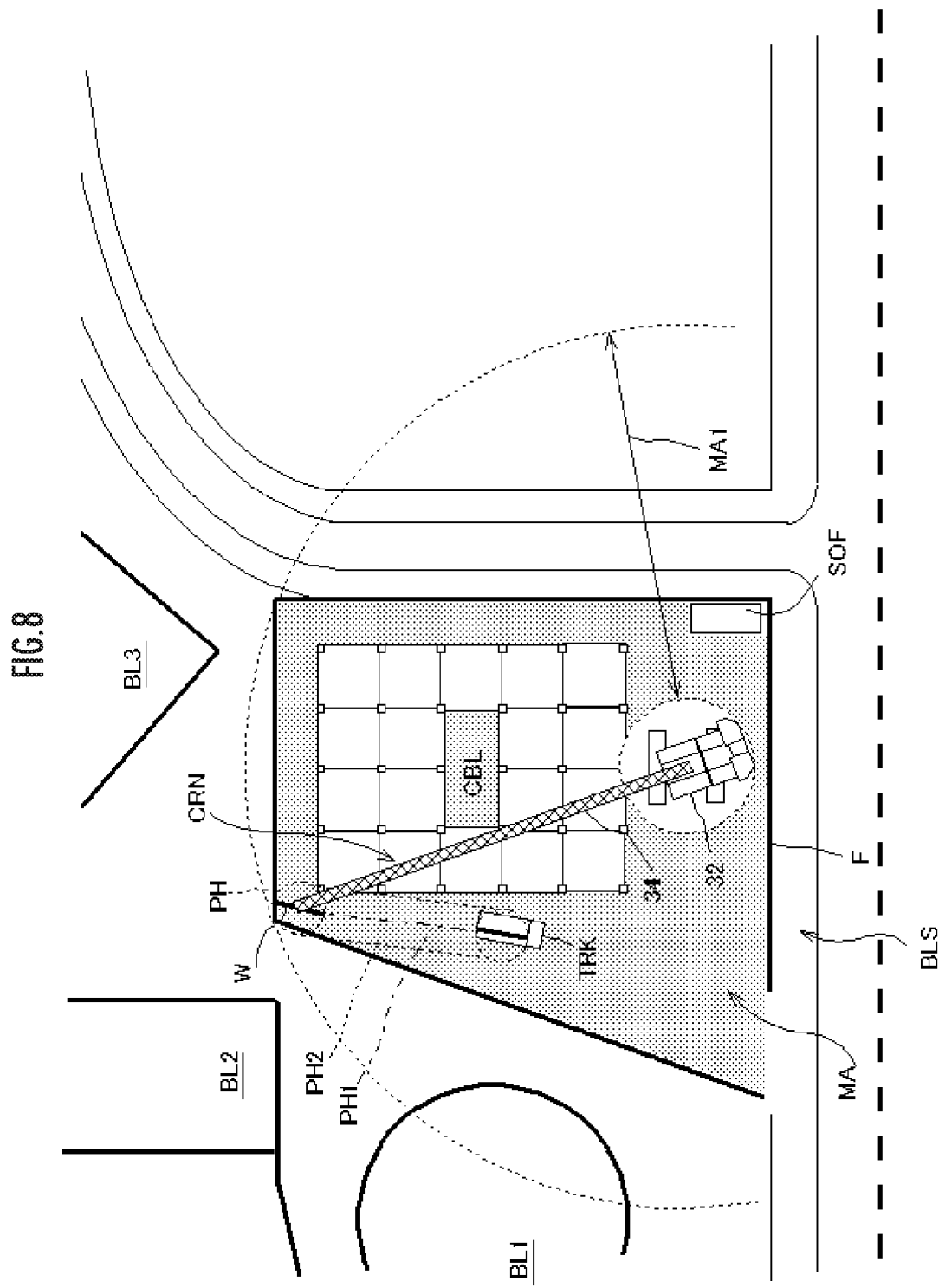
FIG. 8 is a top view in a virtual space which schematically represents the crane and the construction site, which are modeled as a three-dimensional model in the simulator of the first embodiment.

Using a model of such a circular column PH of the lifting load W, a margin against contact with obstacles around the lifting load W (steel material) can be set, and such a radius can be made variable. In addition, using the data of the width of the region which the lifting load reaches based on the data of the diameter of the circular column PH of the lifting load W (steel material), for example, a passing region PH2, which is illustrated in FIG. 8, of the circular column PH of the lifting load W in a case where the lifting load W (steel material) moves through a transportation route PH1 is demarcated. The transportation route PH1 of the lifting load W and the passing region PH2 based on that are stored as route condition information of the transportation information in the data unit 21. FIG. 8 is a top view in a virtual space which schematically represents the crane CRN and the construction site BLS, which are modeled as a three-dimensional model in the simulator of the present embodiment.

Note that in order to model the crane CRN, as the calculation model data, the modeling unit 23 can provide margins (metric spaces) around materials which actually have complicated shapes, for example, piping in an L shape or the like and stairs and can create polygon or voxel data of a three-dimensional model (object) by a combination of elements in simpler shapes (such as a rectangular cuboid, an octagon, a circular column, and a sphere, for example) or by a wire frame particularly in order to reduce a calculation amount, and such data can also be stored in the data unit 21.

(3) Environment Information

The environment information includes actual obstacles around the crane CRN (materials (not illustrated) in the construction site BLS, the fence F, the building to be constructed CBL itself in construction execution, the truck TRK, the site office SOF, and the existing buildings BL1, BL2, and BL3 (and other cranes in a case where plural cranes are present)) in the models illustrated in FIG. 1 and FIG. 8, for example. As for obstacles, data about real estates and so forth in the environment information are acquired from the basic map information (geospatial information) by the Geospatial Information Authority of Japan and from geospatial information created by various parties concerned such as local public entities and private business operators, for example. Further, in a case where the present embodiment is joined to the BIM simulation system and where the environment information is present on the BIM simulation system side, the environment information is acquired. In a case where the present embodiment is not joined to the BIM simulation system, the environment information is input via the output-input device. When the target construction site BLS is modeled, environment data and modeling data of the construction site BLS modeled based on the environment data are stored in the data unit 21 while the environment data and the modeling data are associated with an identifier for each obstacle. Modeling data of the environment information are generated by the modeling unit 23.

(4) Transportation Information

Figure 9:
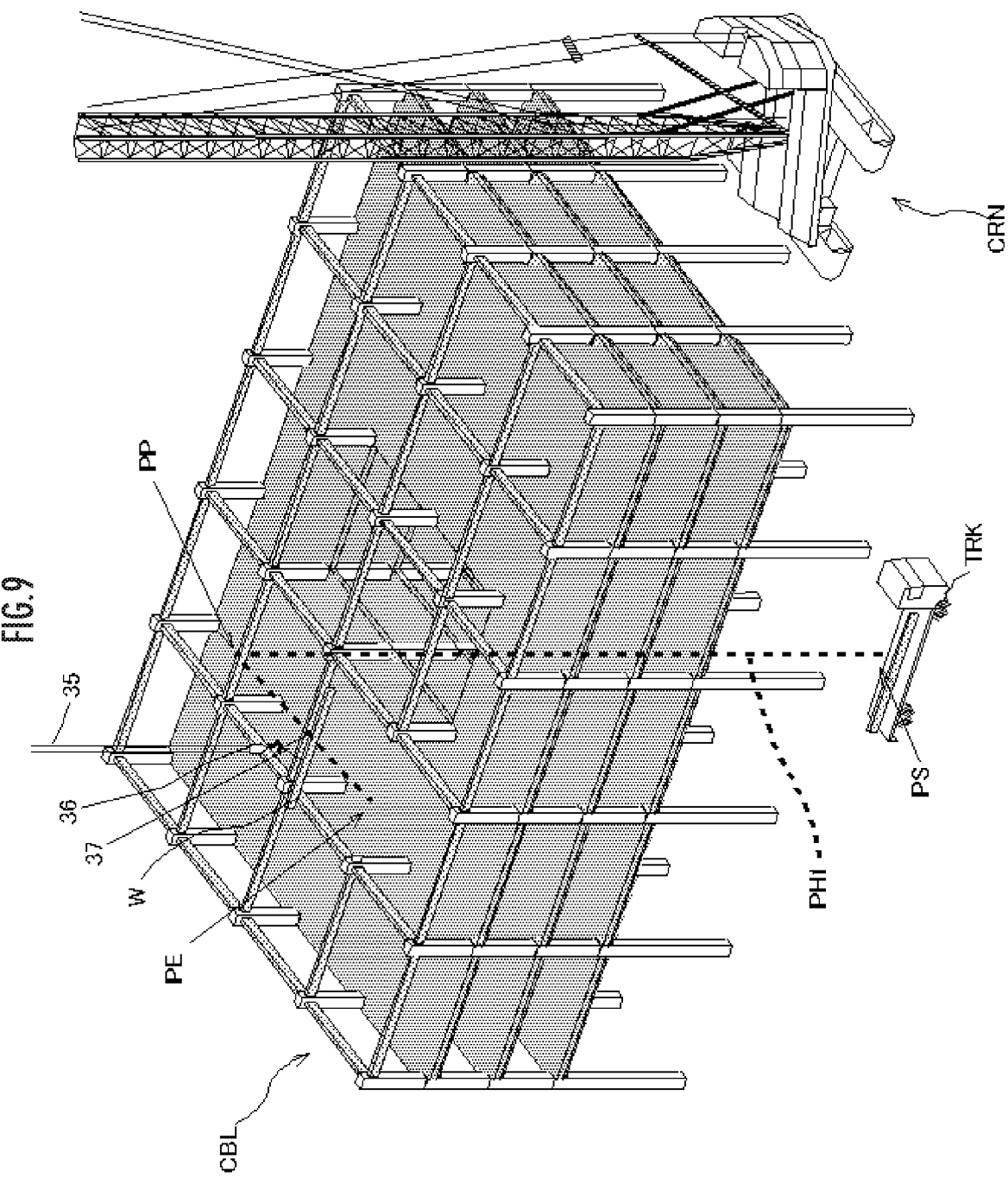
FIG. 9 is a perspective view in a virtual space which schematically represents the crane and a building to be constructed of the construction site, which are modeled as a three-dimensional model to be displayed in the simulator of the first embodiment.

FIG. 9 is a perspective view in a virtual space which schematically represents the crane CRN and the building to be constructed CBL in the construction site BLS, which are modeled as a three-dimensional model and are displayed as an image by the display device 14 of the simulator of the present embodiment.

The transportation information to be stored includes information of positions of a start point PS, a passing point PP, and an end point PE of a material (lifting load) as the transportation route information acquired from the user, for example. In addition, the transportation information to be stored includes information about a clearance range and information about candidate routes (route condition information), which are calculated by the transportation computation unit 24. In addition, the transportation information to be stored includes information which defines the width of the transportation route of the lifting load W (steel material), the width being calculated by the modeling unit 23 (see PH1 in FIG. 8).

[Action of Simulator for Crane]

Figure 10:
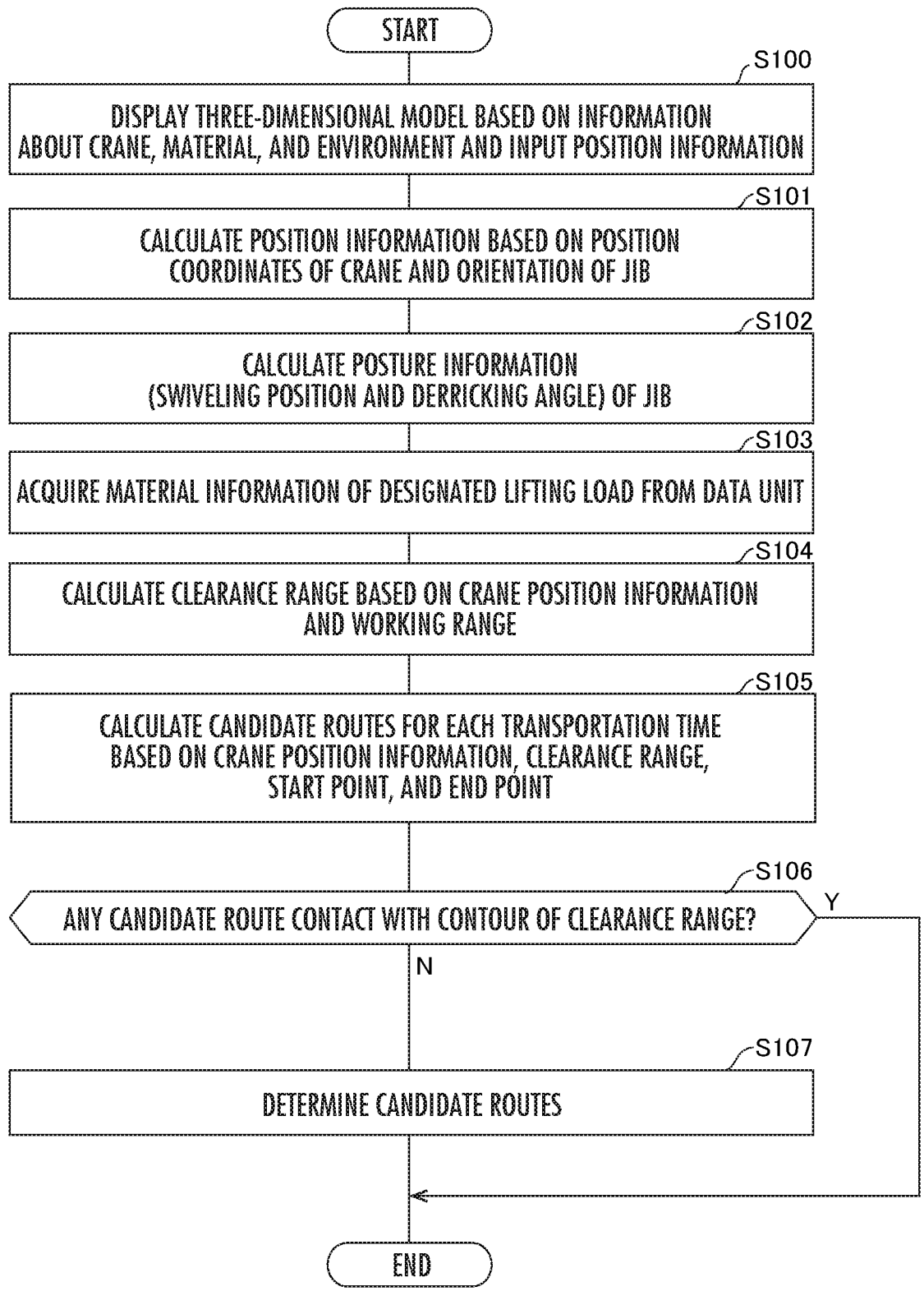
FIG. 10 is a flowchart illustrating a transportation simulation by the crane which is executed by the simulator of the first embodiment.

FIG. 10 is a flowchart illustrating a transportation simulation by the crane which is executed by the simulator of the present embodiment.

The modeling unit 23 generates a three-dimensional model of the building to be constructed CBL in the construction site BLS based on the crane information, the material information, and the environment information which are stored in the data unit 21 and instructs the display device 14 to perform three-dimensional model display via the simulation display unit 25 (STEP 100). As illustrated in FIG. 9, three-dimensional information of the building to be constructed CBL is displayed to the user, and the user is thereby prompted to designate the start point, the passing point, and the end point of a material (lifting load) to be transported. The user uses the image display by the display device 14, which is illustrated in FIG. 9, and the operation device 15 to input position information as the coordinates about a start point position PS, position information as the coordinates about the passing point PP, and position information as the coordinates about an end point position PE (transportation route information).

Next, the transportation computation unit 24 calculates position information based on the position coordinates of the crane CRN (the rotation center of the swiveling device 31) and an orientation of the jib 34 (STEP 101). Specifically, the position information is information, which includes the orientation based on the position coordinates of the installed crane CRN, and is calculated from the crane information or the environment information which is stored in the data unit 21.

Next, the transportation computation unit 24 calculates posture information of the jib 34 (STEP 102). The posture information (a swiveling position and a derricking angle) of the jib 34 is calculated from data of the crane information which are stored in the data unit 21.

Next, the material information (the weight, the center of gravity, and the sizes) of the designated lifting load W is acquired from data of the crane information which are stored in the data unit 21 (STEP 103).

Next, the transportation computation unit 24 calculates a clearance range MA based on the position information of the crane CRN, a working range (for example, MA1 indicated in FIG. 8) of the crane CRN, the material information (the weight, the center of gravity, and the sizes) of the lifting load W, and the environment information (STEP 104). The clearance range MA is a range in which the lifting load is movable, which is defined based on the working range MA1 and acquired information of obstacles, for example. For example, as illustrated in FIG. 8, in a case where the working range MA1 of the crane CRN is formed in a cylindrical shape, the region indicated by the shaded part in FIG. 8 is the clearance range MA. The calculated clearance range MA is stored as a portion of the transportation information (route condition information) in the data unit 21.

Next, the transportation computation unit 24 calculates a three-dimensional model of the crane CRN from the posture information of the jib 34 together with the transportation route information (start point position PS, passing point PP, and end point position PE) from the data unit 21 and calculates a route R from the start point position PS to the end point position PE based on calculated information and information of the clearance range MA. For example, candidate routes are calculated for each transportation time based on the position information of the crane CRN, the clearance range MA, start point position information, and end point position information (STEP 105). Here, the transportation times of the lifting load W through the candidate routes are calculated (the transportation time calculation unit 24b), and those candidate routes and the transportation times are stored in the data unit 21. The candidate routes are candidate passing regions of the lifting load W in a case where the lifting load W (steel material) moves through the candidate transportation routes (for example, see PH2 in FIG. 8). The candidate routes may automatically be generated or may automatically be generated while relay points are arranged.

Priority of the candidate routes is determined in order of shortness of the transportation times. Note that the candidate routes are not limited to a route with a minimum transportation time; however, for example, a candidate route may be calculated for each transportation distance.

Next, it is determined whether the possibility is present that the candidate routes contact with the contour of the clearance range MA (STEP 106). In a case where it is determined that the possibility is present that the candidate routes contact with the contour of the clearance range MA (STEP 106: Y), the simulation is finished.

In a case where it is determined that no candidate route contacts with the contour of the clearance range MA (STEP 106: N), the candidate routes are determined (STEP 107). Then, the transportation computation unit 24 presents the candidate routes to an operator via the simulation display unit 25 and prompts the operator to determine the transportation route from the candidate routes. Note that a configuration may be made such that the transportation route determining unit 24a determines the shortest route as the transportation route, for example.

Modification Examples of Simulator for Crane

The environment information in the data unit 21 of the simulator can include climate information (wind speed and wind direction) in the clearance range to be calculated. Then, the transportation computation unit 24 can control the transportation speed of a material (lifting load W) in accordance with the wind speed and the wind direction. For example, the transportation computation unit 24 performs calculation such that the transportation speed becomes slow in a place with a narrow clearance range (passable space width) and performs calculation such that the transportation speed becomes slow in the clearance range where the wind speed is predicted to be high. In a case where an influence of wind is large because a material (lifting load W) has a plate shape or the like, the transportation computation unit 24 performs calculation such that the transportation speed becomes slow in the clearance range.

In the above embodiment, a lifting load rotation control device (for example, by wireless control) is provided to a sheave in the hook portion 36 attached to the distal end of the wire rope 35, and rotation of the hook can thereby be enabled to be controlled. In this case, the lifting load rotation control device can rotatably control a material (lifting load W), and the transportation computation unit 24 uses rotation posture data from the lifting load rotation control device, thereby intentionally rotates the lifting load W in a space in the clearance range in order to obtain the shortest route, and can calculate a route, in which the rotation posture is directed in an appropriate direction, in a simulation.

Second Embodiment

A second embodiment is the same as the above embodiment except that the simulator 10 of the above embodiment is joined to the BIM simulation system. Thus, only differences between the above embodiment and the second embodiment will be described.

Figure 11:
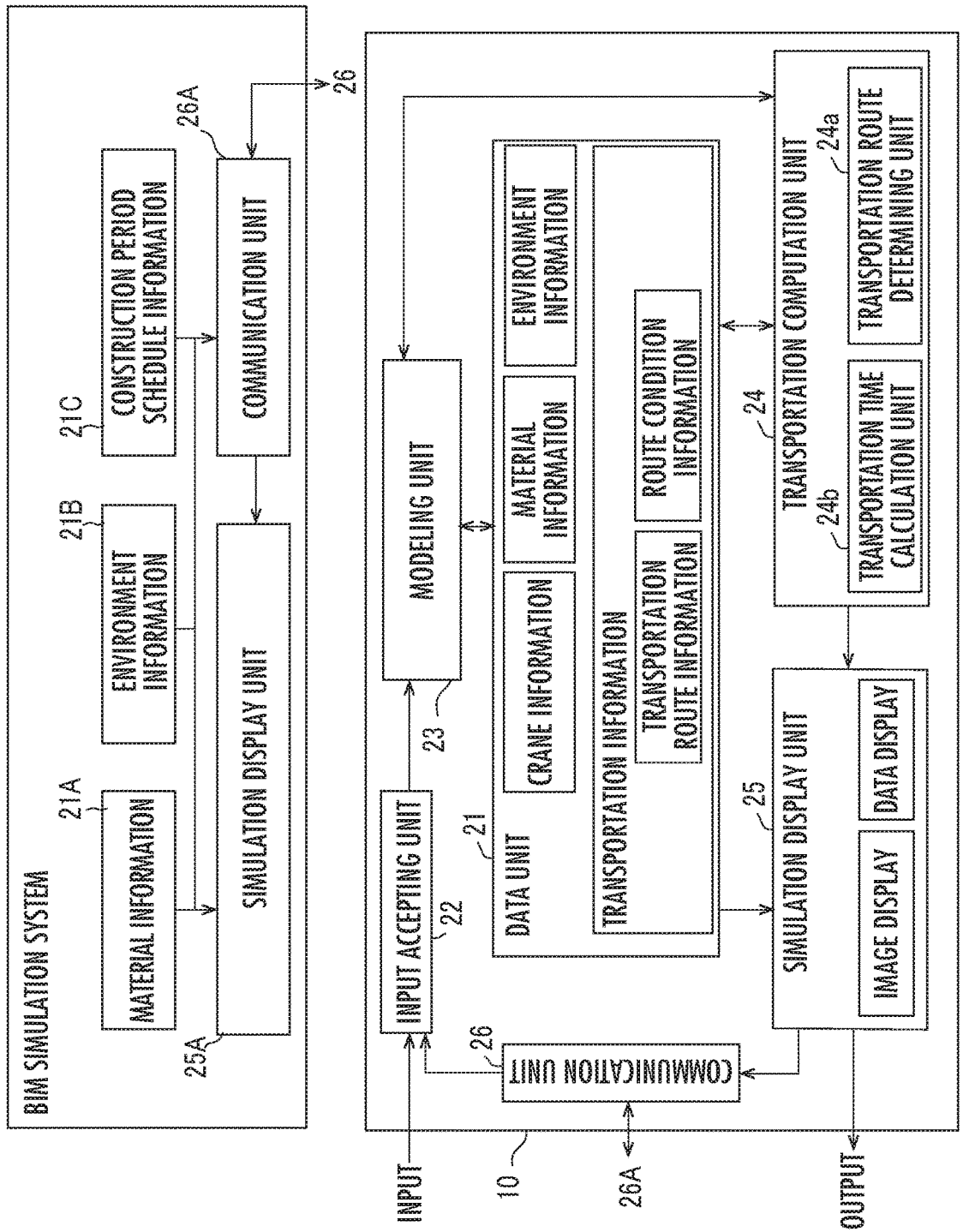
FIG. 11 is a block diagram illustrating a function configuration of a simulator of a second embodiment.

FIG. 11 is a block diagram illustrating a BIM simulation system with the simulator incorporated therein as the second embodiment. The BIM simulation system includes a material information unit 21A, an environment information unit 21B, and a construction period schedule information unit 21C as databases, a simulation display unit 25A, and a communication unit 26A. The material information, the environment information, and construction period schedule information are acquired via the communication unit 26A from the material information unit 21A, the environment information unit 21B, and the construction period schedule information unit 21C, and the simulator 10 can thereby be caused to run. In addition, a simulation program which executes the simulator 10 can be incorporated in an administrative server or the like of the BIM simulation system.

The BIM simulation system denotes a building information model in which spaces to be composed, members (materials), apparatuses, and so forth are provided with attribute information such as specifications, performance, and costs in addition to three-dimensional shape information created in a computer. The BIM simulation system includes not only various models in design phases for the purpose of various investigations about construction design and/or creation of engineering drawings but also models in construction execution phases for the purpose of a construction execution plan, investigations about settlement of members (materials), checking, coordination with working drawings by specialty constructors and creation of construction execution drawings.

Although a BIM simulation system in related art includes a construction execution plan to a certain extent, times of specific crane work are not included because working times are different depending on workers. However, in the second embodiment, the BIM simulation system in the construction execution phases can simulate transportation times and transportation routes, and a process plan of crane work can thereby be established. As a result, an effect of making a process plan of whole construction more specific can be obtained.

Other Modification Examples of Simulator for Crane

In both of the embodiments, descriptions are made about cases where a crawler type crane is used; however, the present invention is not limited to this, and a simulator can also be realized by using a mast climbing type crane. In addition, a crawler type crane is preferably provided with a GNSS (global navigation satellite system) device with a wired or wireless communication device, which calculates the position information of the crawler type crane itself.

The GNSS device is provided as a satellite navigation system, receives navigation signals broadcast by navigation satellites, and measures the position coordinates of the crawler type crane. The GNSS device may be provided to a base trestle of the crawler type crane, for example. The GNSS device receives signals from plural satellites, thereby outputs the present position of the crawler type crane as coordinate data composed of a latitude, a longitude, and an altitude to the simulator 10 by communication with the simulator 10, and can thus acquire the position information of the crawler type crane itself.

As described in the foregoing, in the present invention, a configuration is made in which the environment information about structure portions and so forth located in a construction site, the material information, a construction machine information (for example, the crane information) used when the material is transported are stored in the data unit, plural routes through which the material can be transported are calculated based on the clearance range, which is calculated from the construction machine information and the environment information which are stored in the data unit, the material information, and the construction machine information, and a simulation is performed in which the material is transported by using any of the plural calculated routes. Thus, effects can be obtained such as enabling a route falling within the clearance range to be quickly determined, enabling an automatic crane operation to be performed by using an obtained simulation, and further enabling a time requested for a construction execution plan to be shortened, without being influenced by a skill level of a crane operating person.

REFERENCE SIGNS LIST

10 Simulator
21 data unit
22 input accepting unit
23 modeling unit
24 transportation computation unit
25 simulation display unit
26 communication unit

The invention claimed is:

1. A simulator for work by using a mobile crane including a boom and a jib for transporting a material, the simulator comprising one or more processors that execute computer-executable instructions stored in a memory, wherein the computer-executable instructions executed by the one or more processors cause the simulator to:
electronically retrieve computer-readable construction machine characteristic information as information about a characteristic of the crane including a derricking angle of the crane;
electronically retrieve computer-readable material information as information about a material to be transported by the crane;
electronically retrieve computer-readable transportation route information including a transportation route in transportation of the material, the computer-readable transportation route information includes route condition information as information about conditions of the transportation route and surroundings of the transportation route;
generate a route candidate in which the material avoids contact with obstacles, based on the computer-readable construction machine characteristic information, the computer-readable material information, and the computer-readable transportation route information;
generate transportation time of the route candidate;
transmit display control commands to a display device to cause the route candidate to be displayed on the display;
compute a determined route based on an automated determination that the determined route has a shortest transportation time among the generated transportation times,
the simulation is performed so that the material is transported along the determined route and based on the route condition information so that a speed changes along the way, and
electronically retrieve construction period schedule information and establishes a process plan by the determined transportation route.

2. The simulator according to claim 1, wherein
the computer-readable material information includes an external shape and a weight of the material.

3. The simulator according to claim 1, wherein the route condition information includes information about a width of the transportation route.

4. The simulator according to claim 1, wherein
the computer-readable transportation route information includes a time zone in which the material is transported and the route condition information includes information about conditions of the transportation route and surroundings of the transportation route in the time zone.

5. The simulator according to claim 1,
wherein the computer-executable instructions executed by the one or more processors further cause the simulator to compute whether or not transportation of the material is feasible based on the computer-readable construction machine characteristic information, the computer-readable material information, and the computer-readable transportation route information.

* * * * *